Sept. 11, 1956          H. L. P. UDE          2,762,456
SPLASH LUBRICATING MEANS FOR GEARING
Filed Jan. 14, 1953
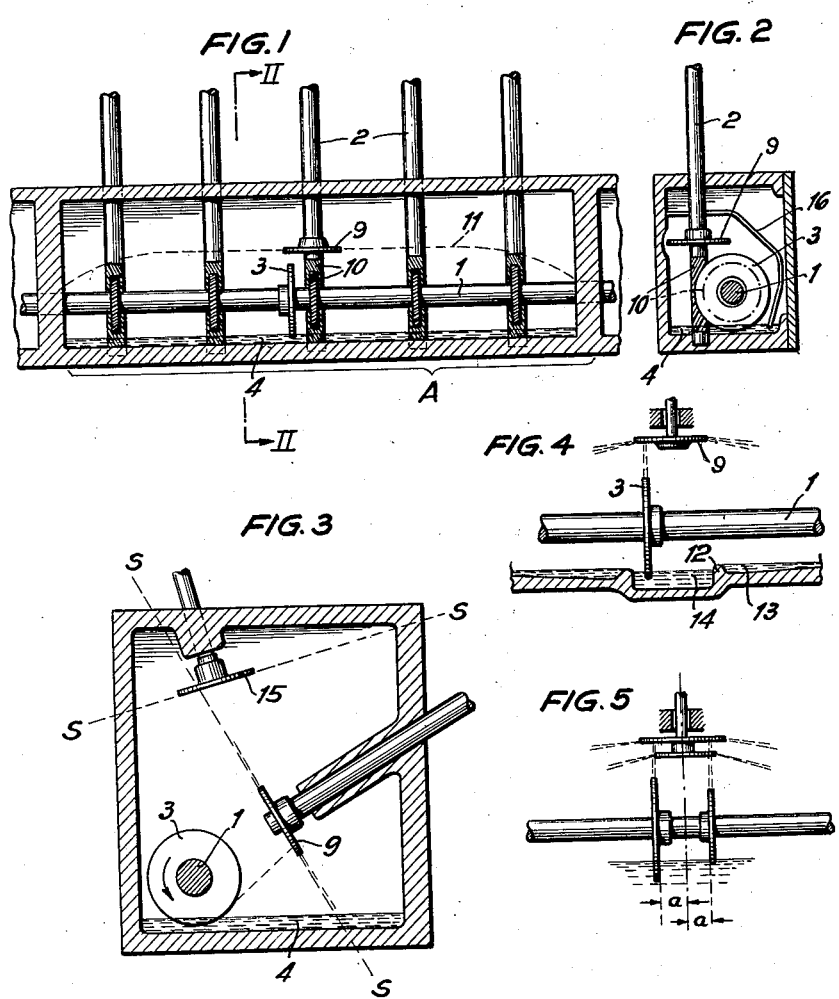
INVENTOR
Hans L. P. Ude

2,762,456

Patented Sept. 11, 1956

United States Patent Office

2,762,456
SPLASH LUBRICATING MEANS FOR GEARING

Hans L. P. Ude, Kaiserslautern, Germany, assignor to Schiess Aktiengesellschaft, Dusseldorf-Oberkassel, Germany, a firm Application January 14, 1953, Serial No. 331,171

Claims priority, application Germany January 15, 1952

4 Claims. (Cl. 184—11)

The present invention relates to lubricating arrangements and, more particularly, to a lubricating arrangement for revolving gearing elements or parts. With heretofore known arrangements of this type the revolving elements of the gearing immerge into the lubricant and, while rotating, pick up lubricant. While with such a lubricating arrangement, circulating pumps and similar conveying means for the lubricant are superfluous, this type of lubrication is nevertheless disadvantageous because of the intensive and continuous turbulence of the lubricant with air, the lubricant may easily suffer chemical changes which affect its lubricating power. In addition thereto, a considerable loss in power is caused by the direct dipping of fast rotating gearing elements into the lubricant. Furthermore, it is rather difficult properly to seal gear casings in which the lubricant is continuously splashed around and in which the walls of the casing are continuously wetted.

In order to simplify the conveying of the lubricant from the lubricant sump to the individual points of lubrication, and in order to overcome the above mentioned drawbacks at least to a certain extent, it has for instance been suggested with positively driven spinning spindles to provide each spindle with a splash disc dipping into the lubricant sump, which disc conveys the lubricant to the neck journal from where the lubricant passes through the respective spindle transmission from the upper end to the lower end and then trickles back into the sump.

It is an object of the invention to provide a further improvement of the lubricating arrangements of the above mentioned type.

It is another object of the invention to provide a lubricating arrangement with a plurality of splash discs, which will be able to lubricate a plurality of spaced lubricating points, while the space required for the lubricating sump will be reduced to a minimum.

These and other objects and advantages of the invention will appear more clearly from the following specification in connection with the accompanying drawings in which:

Fig. 1 represents a longitudinal section through a spindle rail of a spinning machine with positively driven spindles and with a lubricating arrangement according to the invention.

Fig. 2 is a section taken along the line II—II of Fig. 1.

Fig. 3 is a diagrammatic section through a gear casing and illustrates a modified arrangement according to the invention.

Fig. 4 diagrammatically illustrates in longitudinal section a further modification of the invention.

Fig. 5 is a view of a still further modification.

General arrangement

The object of the present invention to carry out a maximum lubrication of a great number of lubricating points with a minimum of elements and to effect such lubrication in a continuous manner with a great saving in lubricants, is obtained according to the present invention by a lubricating arrangement for rotatable gearing, which comprises at least two rotatable splash discs for delivering lubricant to gearing elements to be lubricated, said lubricating arrangement being characterized in that at least one of the said splash discs is arranged to dip into the lubricant and to transmit the lubricant to at least one other disc having its major surface arranged substantially perpendicular to the major surface of said first mentioned disc.

The lubricating arrangement according to the invention may comprise at least three successive rotatable splash discs the first of which is arranged to dip into the lubricant, each of the other successive discs being arranged substantially transversely to the splashing plane of the next preceding disc. If desired, the splash discs may vary in diameter from each other so as to vary the quantity of lubricant conveyed thereby. Advantageously, the lubricating arrangement has guard means extending over the entire length of the gearing, the said guard means being adapted to return sprayed or splashed lubricant into a sump and to protect joints or the like in a casing for the gearing against sprayed or splashed lubricant.

Structural arrangement

Referring now to the drawing in detail and Figs. 1 and 2 thereof in particular, the structure shown therein comprises a rotatable spindle shaft 1 having mounted thereon a splash disc 3 adapted to rotate in unison with shaft 1. The disc 3, which may consist of sheet metal, synthetic material or the like, is in the particular structure shown in Fig. 1, mounted near the intermediate spindle 2 of a spindle rail section A. As will be seen from the drawing, the disc 3 dips into the oil sump 4 and, when rotating, picks up lubricant therefrom and in a manner known per se splashes the lubricant in the direction of its plane toward the outside of said disc due to centrifugal force. A second splash disc 9 is rigidly connected to the spindle 2 above the splash disc 3. The said splash disc 9 is through spindle 2 and worm gear 10 driven by the spindle shaft 1. The plane of the splash disc 9 intersects the plane of the splash disc 3 so that the lubricant picked up by disc 3 from the sump 4 is splashed against the rotating splash disc 9, carried along by the latter and sprayed over all lubricating points of the spindle rail section A. The spray range is indicated in Fig. 1 by the dotted line 11.

By properly dimensioning the discs 3 and 9 and spacing the same in a corresponding manner with regard to each other and the elements to be lubricated, it is possible to feed lubricant to an entire gearing group without undue requirement of material. It will be clear that with such an arrangement no conveying means or the like will be soiled or clogged up, and that the lubricant will not be unduly whirled around.

The limitation of the lubricant feeding by means of the disc 3 to one single place in the head stock or gear casing makes it possible to get along with a relatively small quantity of lubricant and with a low oil sump. It will be clear that it is merely necessary that the oil sump has the required depth below the disc 3 only, as illustrated in Fig. 4. The arrangement according to the invention furthermore makes it possible, for instance by means of an overflow 12, to cause settling of abrasion and dirt with which the lubricant usually mixes in the shop while the spindles are running. This settling is possible because the lubricant in the grooves or troughs 13 is not subjected to any turbulence or whirling movement inasmuch as the whirling is limited to the dipping bath 14 proper.

It will be evident from the above that the present invention yields considerable simplifications and savings in material with regard to the heretofore known arrangements according to which each spindle has associated therewith an individual splash disc. The necessary extent to which the disc 3 has to extend into the lubricant supply, the diameter of the discs 3 and 9, the distance between the two discs, and the number of discs to be arranged in one gear chamber depend upon the R. P. M. of the shafts to be provided with said discs and also upon the size of the gear chamber to be covered by the lubrication, and finally on the consistency of the lubricant.

The described lubricating arrangement is principally operative in both directions of rotation of the discs involved. The intensity of the lubrication in both directions of rotation depends on the speed, size and relative position of the discs and also the position of the elements to be lubricated. Thus, the intensity of the lubrication can be adapted to all requirements of operation and design. In order to cover a predetermined gear chamber in both directions of rotation and with different speeds of rotation, it is, of course, also possible to modify the arrangement in such a manner that splashing is effected by two or more discs of the same or different diameter dipping into the lubricant or by varying the distance $a$ between said discs (see Fig. 5).

As illustrated in Fig. 3, it is also possible to arrange a plurality of rotatable splash discs 3, 9, 15 in series, said discs being arranged so that the plane of each disc intersects the splashing plane S—S of each preceding disc. While, of course, the intensity of the lubrication decreases with each succeeding disc, it will be obvious, that by properly dimensioning the discs, and absolutely intensive lubrication can be assured. In order to be sure that the lubricant is as far as possible concentrated upon the lubricating points and will not unnecessarily splash around in the gear casing, in which instance it would run down the walls and escape through joints, it is advantageous to surround the splash and conveying means with guard means in the form of cover plates. Such cover plates may be of different shape. Fig. 2 shows by way of example a cover plate 16 which surrounds the splash discs 3 and 9 and which extends along the length of the casing section 8 in such a manner that the lubricant in the splashing planes of the individual discs will not hit any joints or other openings in the gear casing. Such cover plates also materially reduce the distance over which the lubricant has to travel for recirculation.

While the invention has been described in connection with the head stock of a ring spinning machine with a positive drive of the spindles, it is to be understood that the invention is not limited to this particular field but can also be used in connection with other types of transmissions wherever it is desired from a single feeding place in a continuous manner to feed a lubricant simultaneously to a plurality of transmission elements.

It is also to be understood that the present invention is not limited to the particular arrangements shown in the drawings but also comprises any modifications within the scope of the appended claims.

What I claim is:

1. A lubricating arrangement for use in connection with rotatable gearing which comprises in combination: a casing including a sump adapted to receive a lubricant, a feeder splash disc rotatably arranged in said casing and adapted to enter into and pick up lubricant from said sump, a plurality of lubricating points within said casing to be supplied with lubricant from said sump, and a series of rotatable conveying discs spaced from each other and from said feeder disc, the arrangement being such that the first of said conveying discs has its major plane at an angle with regard to the splashing plane of said feeder disc and that each succeeding conveying disc has its major plane at an angle with regard to the major plane of the preceding conveying disc for receiving lubricant from said feeder disc and the respective preceding conveying disc and to convey said lubricant to said lubricating points.

2. A lubricating arrangement according to claim 1, in which at least some of the discs differ in diameter from each other.

3. A lubricating arrangement for use in connection with rotatable gearing which comprises in combination: a casing including a sump, feeder splash disc means rotatably mounted in said casing and arranged to enter into and pick up lubricant from said sump, a plurality of lubricating points to be supplied with lubricant from said feeder splash disc means, rotatable conveying disc means interposed in spaced arrangement between said feeder splash disc means and said lubricating points for conveying lubricant to the latter, said conveying disc means directly receiving lubricant from said feeder splash means and being arranged at least nearly perpendicular with regard to said feeder splash disc means, and cover plate means interposed between said conveying disc means and those wall portions of said casing having their plane substantially transverse to the plane of said conveying disc means.

4. A lubricating arrangement for use in connection with rotatable gearing, which comprises in combination: a casing including a sump adapted to receive a lubricant, at least one rotatable splash disk having a free periphery adapted to enter said sump to pick up lubricant therefrom and to subject the same to centrifugal force for splashing said lubricant off said disk means, and at least another rotatable splash disk spaced from the periphery of said first mentioned splash disk and having a free periphery and a face thereof substantially perpendicular to the splashing plane of said first mentioned disk for receiving splashed lubricant from the latter and conveying said last mentioned lubricant simultaneously to a plurality of lubricating stations within said casing.

References Cited in the file of this patent

UNITED STATES PATENTS

| 65,328 | Bachelder | June 4, 1867 |
| 1,099,218 | Norman | June 9, 1914 |
| 1,271,140 | Dickey | July 2, 1918 |
| 1,783,978 | Perry | Dec. 9, 1930 |
| 2,017,260 | Smith | Oct. 15, 1935 |
| 2,511,535 | Lee | June 13, 1950 |
| 2,559,134 | Steele | July 3, 1951 |

FOREIGN PATENTS

| 25,667 | Great Britain | Pat. of 1904 |
| 610,254 | France | June 1, 1926 |